Nov. 2, 1948.    C. B. CAMERON    2,452,631
SELF-ADJUSTING WOOD PEELER
Filed May 4, 1946    3 Sheets-Sheet 1
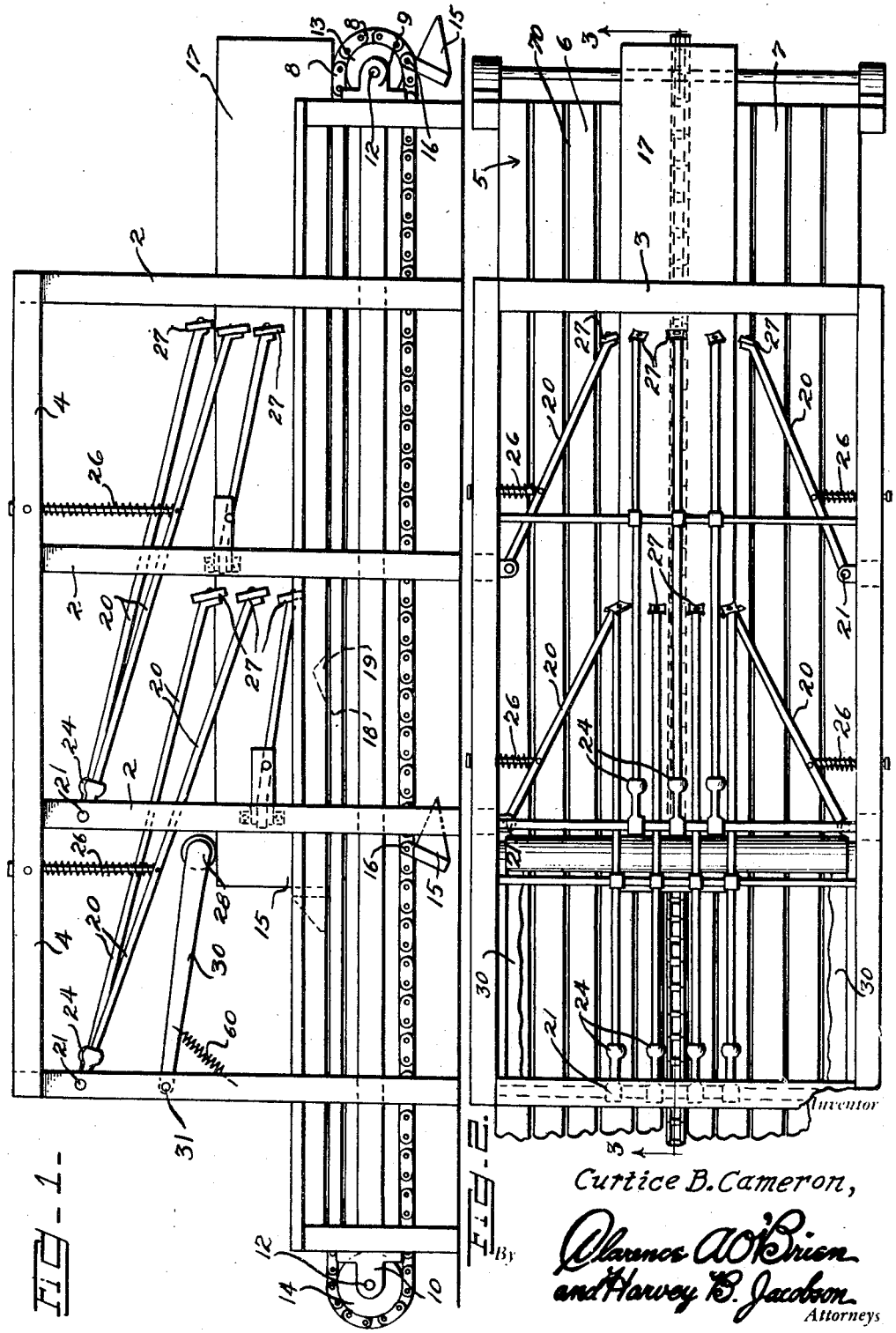

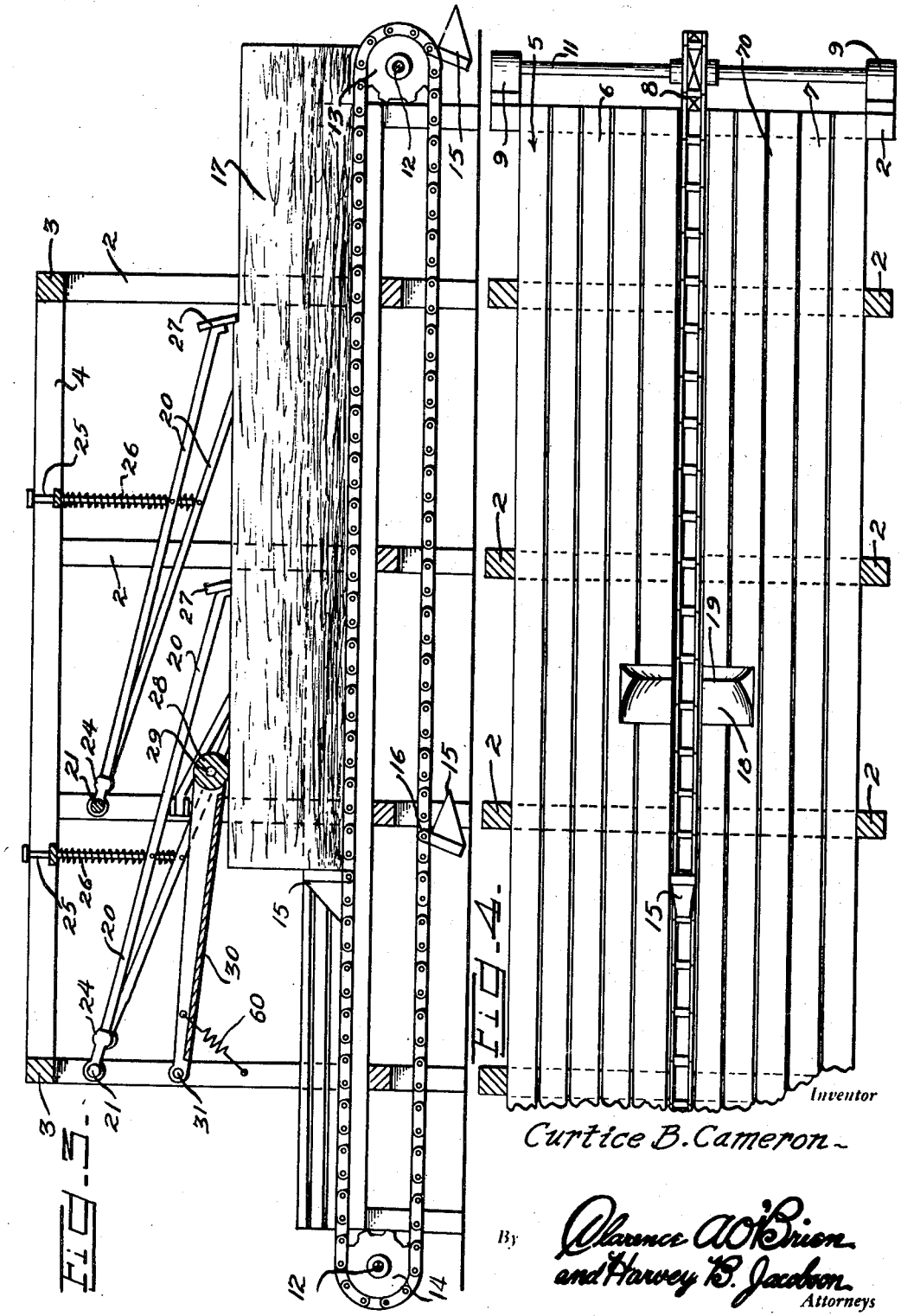

Nov. 2, 1948.  C. B. CAMERON  2,452,631
SELF-ADJUSTING WOOD PEELER
Filed May 4, 1946  3 Sheets-Sheet 3
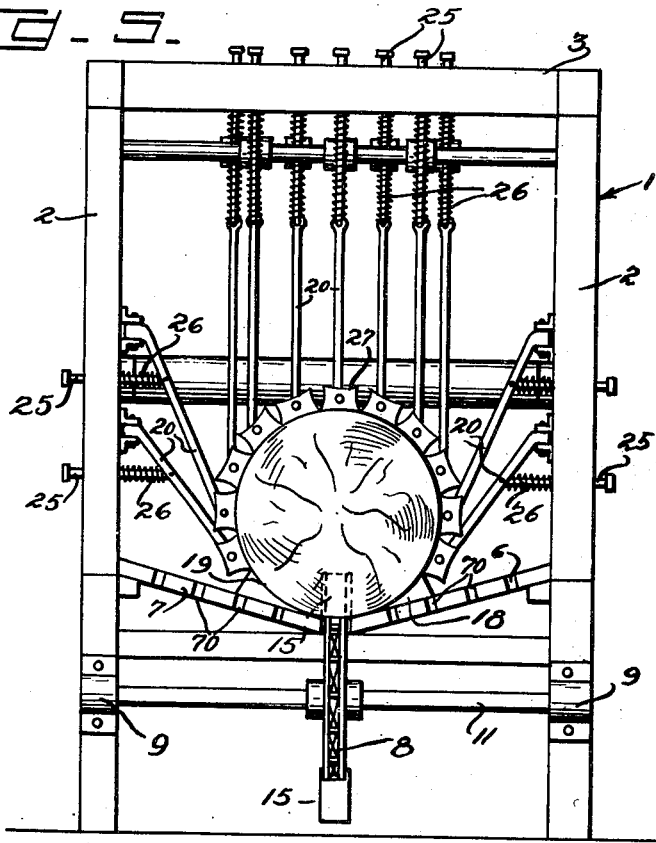
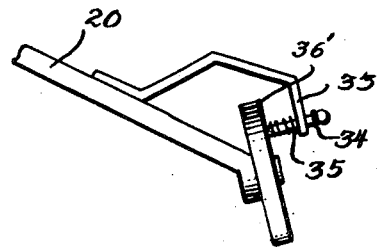
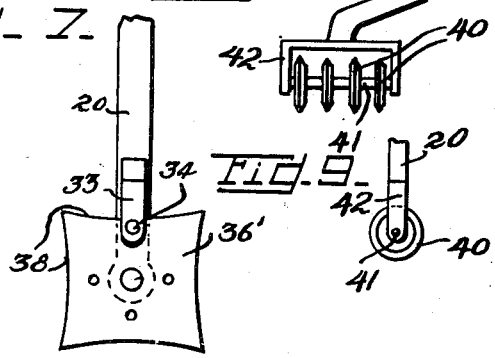
Inventor
Curtice B. Cameron
By Clarence A. O'Brien
and Harvey B. Jacobson
Attorneys Patented Nov. 2, 1948

2,452,631

UNITED STATES PATENT OFFICE 2,452,631

SELF-ADJUSTING WOOD PEELER

Curtice B. Cameron, Laurel, Miss.

Application May 4, 1946, Serial No. 667,326

3 Claims. (Cl. 144—208)

An object of the invention is to provide an improved self-adjusting wood peeler for logs and bolts.

Another object of the invention is to provide a self-adjusting wood peeler for removing the bark from either softwood or hardwood logs, said device including a longitudinally supported trough through which an endless conveyor is adapted to carry logs to be peeled, said logs being engaged by various sets of resiliently tensioned flights of cutting blades whereby the bark will be cut from said logs and fall through the slotted trough to be collected and carted away.

Another object of the invention is to provide an improved self-adjusting wood peeler for removing the bark from either softwood or hardwood logs or bolts including a supporting framework having a V-shaped trough arranged longitudinally thereof and a conveyor mounted in the apex of the trough for transporting logs along said trough to be engaged by a plurality of flights of cutting elements of various types resiliently tensioned so that every part of the surface of said logs will be engaged by the cutting elements to completely peel the bark from the logs.

Another object of the invention is to provide an improved self-adjusting wood peeler for removing the bark from either softwood or hardwood logs or bolts including a framework supporting a V-shaped trough formed with slotted rails and an endless conveyor positioned at the base of said trough and having means for engaging the ends of logs to transport the same along said trough while a series of flights of various type cutter blades are operating on the surface of the log to peel or cut the bark therefrom, together with a roller for holding down the rear end of the log as it starts through the peeling machine.

Other objects will appear as the description proceeds.

In the accompanying drawings which form a part of this application,

Figure 1 is a side elevation of the improved self-adjusting wood peeler;

Figure 2 is a plan view of the improved self-adjusting wood peeler;

Figure 3 is a sectional view taken on the line 3—3 of Figure 2;

Figure 4 is a plan view looking down on the slotted trough and endless conveyor mechanism;

Figure 5 is an end view of the improved self-adjusting wood peeler;

Figure 6 is a side elevation of a disc cutter element;

Figure 7 is a front elevation of a four-edged cutter element;

Figure 8 is a front elevation of a multiple disc cutting element, and

Figure 9 is an end view of the multiple disc cutter element illustrated in Figure 8.

Like characters of reference are used throughout the following specification and the accompanying drawings to designate corresponding parts.

In carrying out the invention, there is provided an improved form of self-adjusting wood peeler including a supporting frame generally denoted by the reference numeral 1, and including a plurality of spaced vertically extending frame members 2 and a plurality of interconnected cross members 3, and longitudinally extending side frame members 4 connected to the upper ends of said vertically disposed side frame members 2.

The lower ends of the spaced side frame members 2 comprise supporting leg portions for the self-adjusting wood peeler, and support a longitudinally extending trough, generally denoted by reference numeral 5, comprising oppositely disposed sloping sides 6 and 7 formed by spaced longitudinally extending boards to provide slots 10 extending longitudinally of the trough through which bark, cut from logs or bolts, will pass to be collected below the device and carted away. The trough 5 is substantially V-shaped in cross-section, and is formed with a longitudinally extending slot at its lower portion in which an endless conveyor 8 is adapted to extend. Bearing brackets 9 and 10 are secured to the opposite ends of the framework and support transversely extending shafts 11 and 12, which in turn support sprocket wheels 13 and 14, over which the endless conveyor chain 8 is adapted to pass.

A plurality of spaced swing blocks 15 are disposed at various points along the conveyor chain 8, and are pivoted thereon on pivot pins 16, and are free to swing below the lower reach of the conveyor chain, but when the swing plates reach the upper flight of the conveyor chain, they will rest thereon where they may engage the adjacent end of a log or bolt 17 which is to be peeled.

A U-shape undercutting plate 18 is secured transversely of the trough, and is provided with an arcuate cutting edge 19, whereby when the log or bolt 17 is guided through the trough the cutting edge 19 will engage the lower portion of the said log or bolt to peel the bark therefrom.

A plurality of flights of cutting elements are mounted along the vertically extending side frame members 2. They are held by a plurality of arms 20 pivotally supported between brackets on said members at 21. Each arm is provided with a universal joint 24 for universal movement of the cutter element at its lower end so that the cutter element reaches each part of the surface of the log regardless of the contour thereof.

The cutter element supporting arms supported on the side frame members 2 are provided with attached guide pins 25. Coil springs 26 are mounted on said pins between said arms so that each cutting element is spring biased into contact with the surface of the log or bolt 17 to be peeled. The side cutting elements will remove the bark from the opposite sides of the log while the underplate 18 with the cutting edge 19 will remove the bark from the lower portion of the log as it is moved longitudinally through the trough.

The upper flight of arms 20 likewise support cutter elements 27 at their lower ends and co-operate with the guide pins 25 and coil springs 26 positioned thereabout, similarly to the construction of the arms at the opposite side of the device. The arms supported by the cross member remove the bark from the top of the logs as they move longitudinally through the trough, and consequently as a log is moved from one end to the other of the trough all of its bark will be removed to fall through the slots 70 between the boards forming the trough, and will drop into a suitable pit (not shown) where it may be removed and hauled away.

A transversely extending roller 28 is mounted upon a shaft 29 at the forward end of a pivoted frame 30, which in turn is pivoted at 31 to the opposite side frame members 2, so that as the logs or bolts 17 are started through the peeling machine, the forward end of said logs will pass under the roller so that as the peeling operation is carried on the rear end of the log is pressed downwardly to prevent the same from jumping up. If desired, the roller may be weighted in any manner to give sufficient weight to hold down logs of any size and weight, and is held down by the coil springs 60 secured between the frame 30 and the side frame members 2.

It will be understood that various types of cutting elements may be used, one type being illustrated in Figure 6 of the drawings comprising a disc 32 mounted upon a pin held by the arm 20. The arm carries a bracket 33 supporting a pin 34 upon which a coil spring 35 is mounted so as to fix the position of the cutting edge of the disc. This position may be changed so as to bring other sections of the cutting edge into operative position.

A modified form of cutter element 36' is illustrated in Figure 7 of the drawings and comprises a square blade having four cutting surfaces 38, said cutting element being supported at the lower end of the rod 20, and is provided with a spring supporting pin similar to pin 34 shown in Figure 6 of the drawings.

In Figures 8 and 9 of the drawings, there is shown a plurality of disc cutters 40 mounted upon a shaft 41 between an inverted U-shaped bracket 42 mounted on the lower end of the arm 20, whereby said disc cutting element will score the bark so that the same will readily be removed when engaged by the various types of cutter elements.

From the foregoing description it will be apparent that there has been devised a highly efficient form of self-adjusting log or bolt peeler, which will be relatively inexpensive to manufacture and produce.

While the preferred embodiment of the instant invention has been illustrated and described, it will be understood that it is not intended to limit the scope of the invention thereto, as many minor changes in detail of construction may be resorted to.

Having thus described my invention what I claim as new and desire to secure by Letters Patent of the United States is:

1. A self-adjusting log peeler including a supporting frame, a V-shaped slotted trough mounted longitudinally thereof and having longitudinally slotted opposite sides, an endless conveyor disposed between the opposite sides at the apex of said trough, means on said conveyor for engaging the log to move the same longitudinally of said trough, an undercutter plate disposed transversely of the trough adjacent its apex for removing the bark from the lower portion of a log as it is moved longitudinally along the trough, a plurality of cutter elements supported by arms pivoted on said frame, said cutter elements engaging the opposite sides and top of the log to cut the bark therefrom, and means mounted between said arms and frame to resiliently bias said cutter elements towards said log.

2. A self-adjusting log peeler as claimed in claim 1, and a roller carried by a member which extends over said trough and is pivoted to one end of said frame, and means connecting said member and frame to resiliently bias said roller toward said trough, whereby said roller is adapted to engage the top surface of a log as it moves longitudinally through the trough to hold the same down while the bark is being removed therefrom by said cutter elements.

3. A self adjusting log peeler as claimed in claim 1, in which said cutter element supporting arms are pivoted on the frame members by means of universal joints for adjustment of the cutter elements to the configuration of the log.

CURTICE B. CAMERON.

REFERENCES CITED

The following references are of record in the file of this patent:

UNITED STATES PATENTS

| Number | Name | Date |
|---|---|---|
| 487,015 | Judkins | Nov. 29, 1892 |
| 641,202 | Garland | Jan. 9, 1900 |
| 1,440,042 | Whalley | Dec. 26, 1922 |
| 1,539,603 | Saprones | May 26, 1925 |
| 1,817,158 | Mitchell et al. | Aug. 4, 1931 |
| 1,887,908 | Tidblad | Nov. 15, 1932 |
| 2,025,337 | Camden et al. | Dec. 24, 1935 |

FOREIGN PATENTS

| Number | Country | Date |
|---|---|---|
| 375,241 | Germany | May 9, 1923 |
| 101,409 | Sweden | Apr. 22, 1941 |